United States Patent
Kadowaki

(10) Patent No.: US 11,780,311 B2
(45) Date of Patent: Oct. 10, 2023

(54) TORQUE ROD

(71) Applicant: YAMASHITA RUBBER CO., LTD., Saitama (JP)

(72) Inventor: Hirokazu Kadowaki, Saitama (JP)

(73) Assignee: YAMASHITA RUBBER CO., LTD., Fujimino (JP)

( * ) Notice: Subject to any disclaimer, the term of this patent is extended or adjusted under 35 U.S.C. 154(b) by 1 day.

(21) Appl. No.: 17/543,043

(22) Filed: Dec. 6, 2021

(65) Prior Publication Data
US 2022/0176792 A1 Jun. 9, 2022

(30) Foreign Application Priority Data
Dec. 8, 2020 (JP) .................... 2020-203245

(51) Int. Cl.
*F16F 1/38* (2006.01)
*B60K 5/12* (2006.01)
*F16F 3/087* (2006.01)

(52) U.S. Cl.
CPC .......... *B60K 5/1208* (2013.01); *F16F 3/0873* (2013.01)

(58) Field of Classification Search
CPC .......... F16F 1/3863; F16F 1/38; F16F 3/0873; F16F 1/3732; B60K 5/1241; B60K 5/1208
See application file for complete search history.

(56) References Cited

U.S. PATENT DOCUMENTS

| | | | | |
|---|---|---|---|---|
| 8,403,309 B2* | 3/2013 | Kamei | .................... | F16F 7/123 |
| | | | | 267/141 |
| 8,430,382 B2* | 4/2013 | Kashihara | ............ | B60K 5/1241 |
| | | | | 74/579 E |
| 8,500,109 B2* | 8/2013 | Takeshima | ........... | B60K 5/1208 |
| | | | | 267/293 |
| 8,794,605 B2* | 8/2014 | Mizobe | ................. | F16F 1/3873 |
| | | | | 74/587 |
| 9,347,517 B2* | 5/2016 | Yokawa | .................... | F16F 1/38 |
| 9,470,289 B2* | 10/2016 | Shimada | ................. | F16F 15/08 |
| 9,533,559 B2* | 1/2017 | Inatomi | .................... | F16F 15/08 |

(Continued)

FOREIGN PATENT DOCUMENTS

| CN | 107972468 A | 5/2018 |
|---|---|---|
| JP | 2014-105765 | 6/2014 |

OTHER PUBLICATIONS

Chinese Office Action dated May 29, 2023, Application No. 202111485919.0, English translation included, 23 pages.

*Primary Examiner* — Thomas W Irvin
(74) *Attorney, Agent, or Firm* — Rankin, Hill & Clark LLP

(57) ABSTRACT

A torque rod includes a rod body, a large round portion, and a small round portion. The large round portion is provided at one end of the rod body. The small round portion is provided at the other end of the rod body. The large round portion includes an outer portion, an inner portion, and a joint portion. The outer portion has a tubular shape. The inner portion is provided on an inner side of the outer portion and has an annular opening to which an attaching member is attached. The joint portion elastically joins the outer portion and the inner portion. The inner portion includes a base portion and an extending portion. The base portion has the opening formed therein. The extending portion extends from the base portion toward the small round portion. The joint portion is provided between the extending portion and the outer portion.

5 Claims, 7 Drawing Sheets

(56) References Cited

U.S. PATENT DOCUMENTS

| | | | | |
|---|---|---|---|---|
| 9,796,255 | B2* | 10/2017 | Inatomi | B60K 5/1241 |
| 2005/0254888 | A1* | 11/2005 | Oji | F16F 1/3849 |
| | | | | 403/187 |
| 2008/0315473 | A1* | 12/2008 | Nishimae | F16F 7/08 |
| | | | | 267/140.11 |
| 2009/0174126 | A1* | 7/2009 | Takeshima | F16F 3/0873 |
| | | | | 267/140.4 |
| 2014/0151946 | A1* | 6/2014 | Yokawa | B60K 5/1241 |
| | | | | 267/292 |
| 2015/0219182 | A1* | 8/2015 | Shimada | F16F 1/3849 |
| | | | | 267/140.5 |
| 2016/0152127 | A1* | 6/2016 | Inatomi | B60K 5/1241 |
| | | | | 248/674 |
| 2016/0176279 | A1* | 6/2016 | Inatomi | F16F 1/3849 |
| | | | | 248/638 |
| 2018/0229595 | A1* | 8/2018 | Hatano | F16F 3/12 |
| 2019/0225067 | A1* | 7/2019 | Ohashi | F16F 15/08 |
| 2022/0063392 | A1* | 3/2022 | Cho | F16F 1/3835 |
| 2022/0089011 | A1* | 3/2022 | Kadowaki | B60K 5/1208 |

* cited by examiner

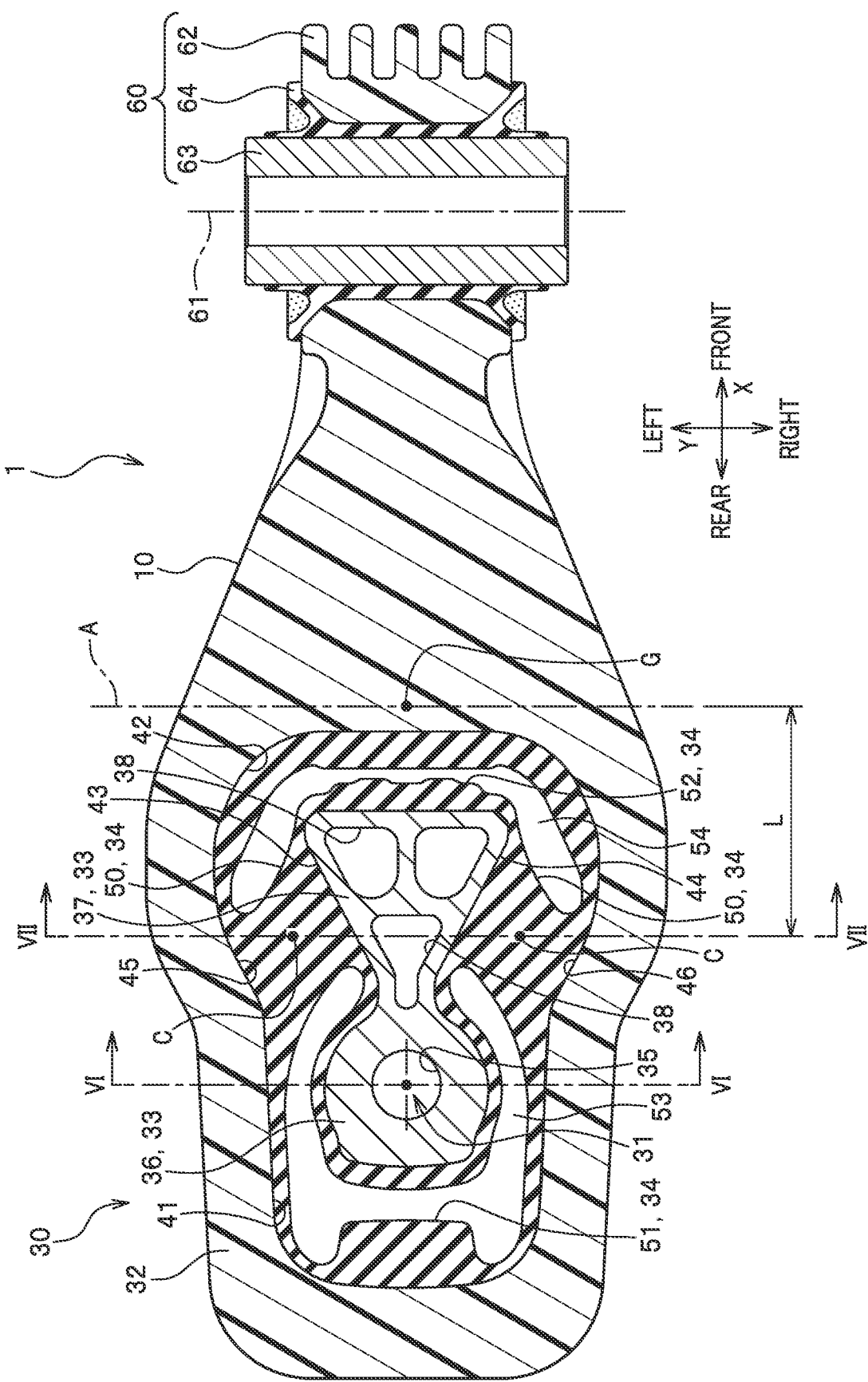

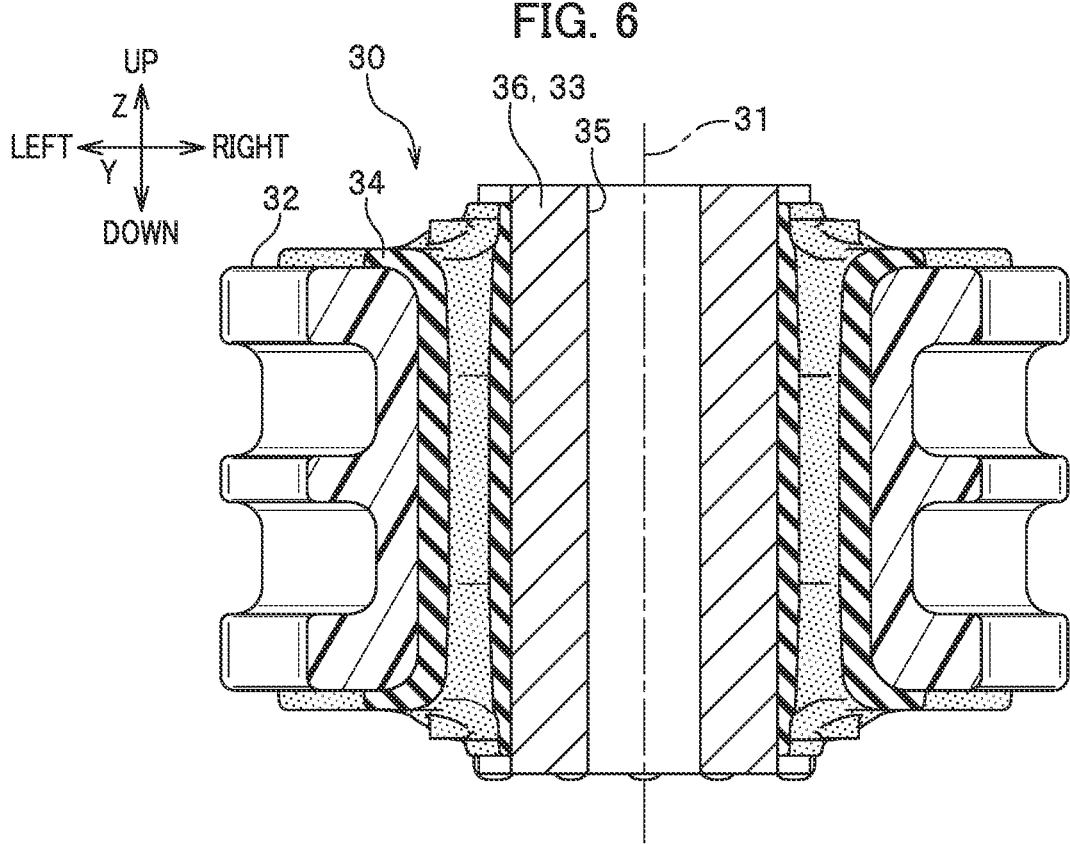
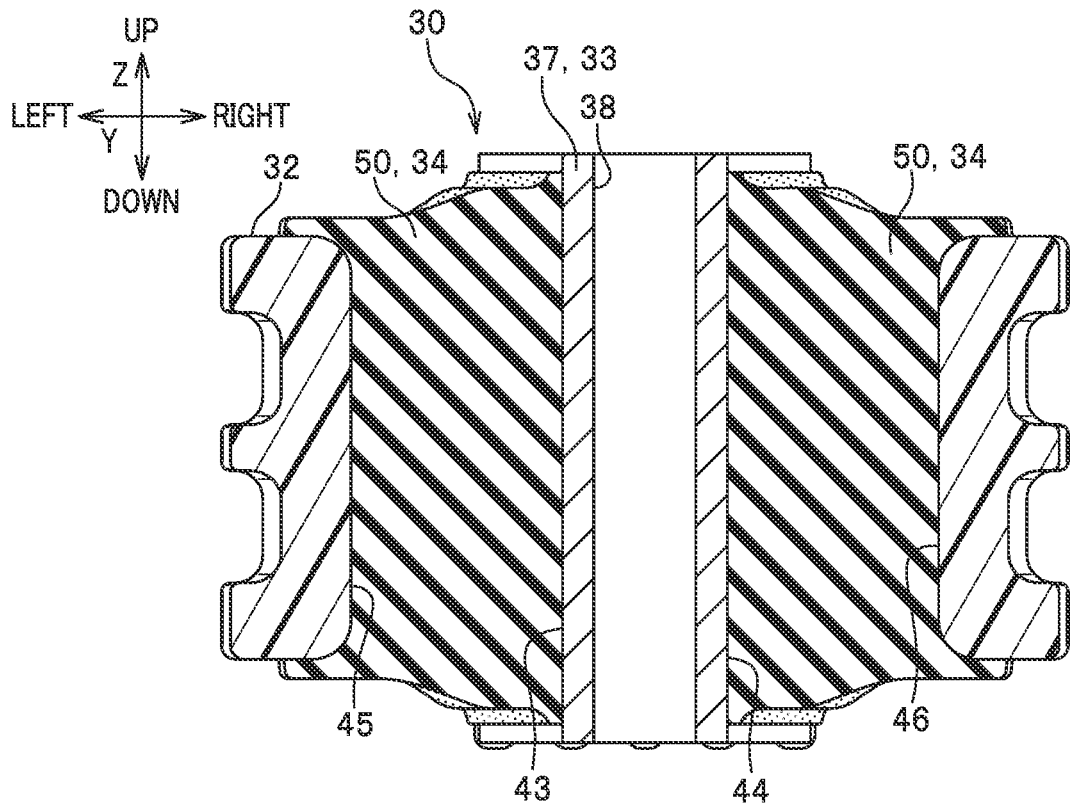

TORQUE ROD

CROSS-REFERENCE TO RELATED APPLICATION

This application is based upon and claims priority from the Japanese Patent Application No. 2020-203245, filed on Dec. 8, 2020, the entire contents of which are incorporated herein by reference.

TECHNICAL FIELD

The present invention relates to a torque rod, and more particularly to a torque rod for vibration-proof connection between a prime mover such as an automobile engine or a motor and a vehicle body.

BACKGROUND

A torque rod is known as an example of an anti-vibration device for vibration-proof connection between a prime mover such as an automobile engine and a vehicle body (see, for example, Japanese Patent Application Publication No. 2014-105765 (Patent Document 1)).

The torque rod includes a rod body, a large round portion that is provided at one end of the rod body, and a small round portion that is provided at the other end of the rod body. The large round portion and the small round portion each include a tubular outer portion, an inner portion that is provided on the inner side of the outer portion, and a joint portion that elastically joins the outer portion and the inner portion. Then, the inner portion of the small round portion is connected to a prime mover such as an engine, and the inner portion of the large round portion is connected to the vehicle body.

SUMMARY OF THE INVENTION

A torque rod having such a structure suffers rigid body resonance due to the vibration of a prime mover such as an engine, for example, in response to the vibration in each of the longitudinal direction and the up-down direction orthogonal thereto. Of these, in particular, the vibration in the up-down direction affects the room sound level, riding comfort, and the like, so that it is required to make it difficult to transmit the vibration in the up-down direction to the vehicle body side.

The vibration transmission characteristic curve of a conventional torque rod has a peak at a relatively high frequency close to the resonance frequency of a vehicle body or the like, and has a high vibration transmission characteristic in a frequency range with high sensitivity on the vehicle body side. Since a torque rod having such a vibration transmission characteristic may have insufficient vibration isolation, further improvement of the vibration transmission characteristic is required. Note that the frequency range with high sensitivity on the vehicle body side refers to a frequency range in which vibration is easily transmitted and becomes a sound because it is close to the resonance frequency of the vehicle body or the like, and corresponds to a frequency range in which vibration isolation is desired.

Here, if the peak frequency of the rigid body resonance of a torque rod (hereinafter referred to as the rigid body resonance frequency) is lowered so as to deviate from the frequency range with high sensitivity on the vehicle body side, the vibration transmission characteristic in the high-sensitivity frequency range can be lowered. As a method of lowering the rigid body resonance frequency of a torque rod, for example, there is a method of adding mass to the tip of the torque rod, but this hinders the basic requirement of weight reduction of the vehicle. Further, a method of reducing the spring constant in the up-down direction of the large round portion connected to the vehicle body has been proposed in Patent Document 1 and the like, but it is already in a technically mature region and no significant progress can be expected.

Further, in a certain vehicle, even if the rigid body resonance frequency of the torque rod is shifted to a lower side to lower the vibration transmission characteristic in a high-sensitivity frequency range, the same effect may not always be obtained in another vehicle. Therefore, it is necessary to tune the rigid body resonance frequency of the torque rod for each vehicle.

The present invention has been made in view of the above circumstances, and an object thereof is to provide a torque rod capable of lowering a vibration transmission characteristic from a viewpoint different from the conventional one without increasing the weight.

In order to achieve the above object, a torque rod according to the present invention includes a rod body, a first bush, and a second bush. The first bush is provided at one end of the rod body. The second bush is provided at the other end of the rod body. The first bush includes an outer portion, an inner portion, and a joint portion. The outer portion has a tubular shape. The inner portion is provided on an inner side of the outer portion and has an annular opening to which an attaching member is attached. The joint portion elastically joins the outer portion and the inner portion. The inner portion includes a base portion and an extending portion. The base portion has the opening formed therein. The extending portion extends from the base portion toward the second bush. The joint portion is provided between the extending portion and the outer portion.

The torque rod according to the present invention is installed so that the direction of the central axis of the opening of the first bush is in the up-down direction when mounted on a vehicle. Then, when vibration in the up-down direction is inputted to the second bush, the first bush vibrates vertically so as to rotate around an axis passing through the center of gravity of the torque rod and parallel to the right-left direction. The rotational rigidity S in this case is proportional to $(K \times L^2)$. Here, K is the spring constant of the joint portion in the direction of the central axis of the opening of the first bush. L is the distance (span) between the elastic deformation center of the joint portion of the first bush and the center of gravity of the torque rod in the longitudinal direction of the rod body. In the first bush of the present invention, a joint portion is provided between the extending portion extending from the base portion of the inner portion toward the second bush direction and the outer portion. Therefore, conventionally, the elastic deformation center of the joint portion of the first bush is located on the side opposite to the center of gravity of the torque rod from the opening, but in the present embodiment, it is moved to the center of gravity side of the torque rod. Therefore, the distance L becomes smaller and the rotational rigidity S decreases. As a result, the peak value of the vibration transmission characteristic is reduced. Further, since the rigid body resonance frequency shifts to the lower side, the vibration transmission characteristic in the frequency range with high sensitivity on the vehicle body side is lowered. As a result, the room sound level is reduced and the riding comfort is improved.

That is, according to the present invention, it is possible to provide a torque rod capable of lowering a vibration transmission characteristic from a viewpoint different from the conventional one without increasing the weight.

Note that the reduction of the peak value of the vibration transmission characteristic includes the case of a flat vibration transmission characteristic (no peak value).

In the torque rod described above, it is preferable that the extending portion has a narrow width on the base portion side and gradually increases in width as approaching the second bush.

In this configuration, the surface of the extending portion provided with the joint portion is a surface inclined in the direction toward the base portion side. Therefore, the joint portion can receive a compressive load acting in the longitudinal direction of the rod body. Therefore, the spring constant of the first bush in the longitudinal direction of the rod body becomes high. Further, since the deformation of the joint portion in the direction of the central axis of the opening of the first bush is a shear deformation, it is more easily deformed than the compression deformation of the joint portion in the longitudinal direction of the rod body. Therefore, the spring constant of the joint portion in the direction of the central axis of the opening of the first bush becomes relatively small, and the vibration transmission characteristic is lowered. As a result, the spring constant of the first bush in the longitudinal direction of the rod body can be increased while reducing the vibration transmission characteristic.

In the torque rod described above, it is preferable that the outer surface of the extending portion includes a first extending portion side surface and a second extending portion side surface, to which the joint portion is joined. Further, it is preferable that the inner surface of the outer portion includes a first outer portion side surface and a second outer portion side surface, to which the joint portion is joined. In this case, the first extending portion side surface and the first outer portion side surface, and the second extending portion side surface and the second outer portion side surface are formed so as to be parallel to each other.

In this configuration, the joint portion can more reliably receive the compressive load acting in the longitudinal direction of the rod body.

In the torque rod described above, it is preferable that the outer portion includes a first opening portion that accommodates the base portion of the inner portion and a second opening portion that accommodates the extending portion of the inner portion. In this case, the width of the first opening portion is smaller than the width of the second opening portion.

In this configuration, the outer portion of the first bush can be made smaller, so that the weight reduction and cost reduction of the torque rod are possible.

In the torque rod described above, it is preferable that the inner portion includes a cutout portion in addition to the opening.

In this configuration, by forming a cutout portion in the inner portion for weight reduction, it is possible to suppress an increase in the weight of the torque rod even if the extending portion of the inner portion is lengthened, which improves the degree of freedom in designing the length of the extending portion. Therefore, the torque rod can be used in a wide range of vehicle types.

The present invention makes it possible to provide a torque rod capable of lowering a vibration transmission characteristic from a viewpoint different from the conventional one without increasing the weight.

BRIEF DESCRIPTION OF THE DRAWINGS

FIG. 5 is a cross-sectional view taken along line V-V of FIG. 4.

FIG. 6 is a cross-sectional view taken along line VI-VI of FIG. 5.

FIG. 7 is a cross-sectional view taken along line VII-VII of FIG. 5.

DETAILED DESCRIPTION OF THE EMBODIMENTS

Figure 1:
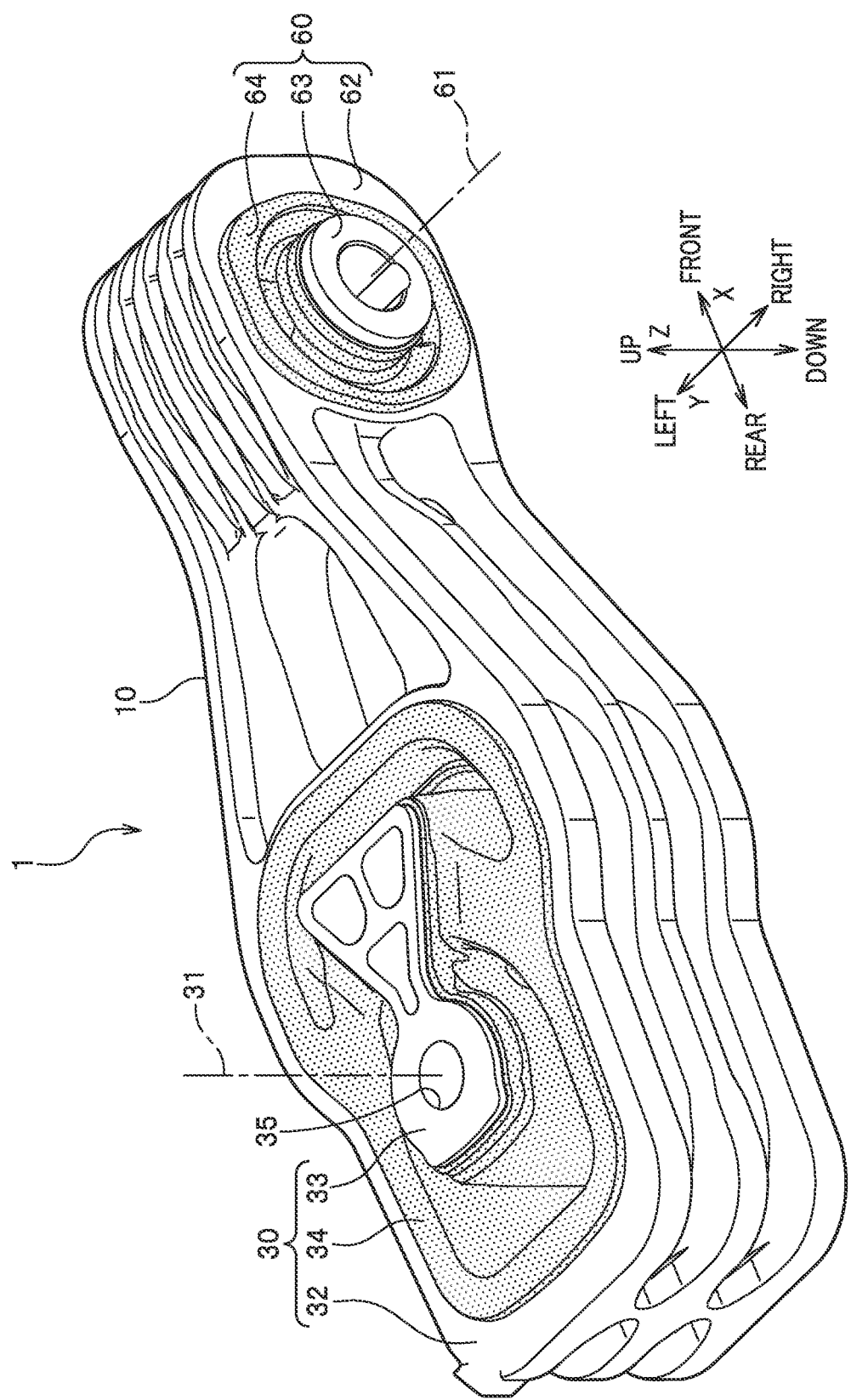
FIG. 1 is a perspective view of a torque rod according to the present embodiment.

An embodiment of the present invention will be described in detail with reference to the drawings as appropriate.

In each figure, common constituent elements and constituent elements of the same type are designated by the same reference numerals, and duplicate description thereof will be omitted as appropriate. Note that in the following description, the up-down direction, the front-rear direction, and the right-left direction refer to the respective directions of the vehicle in the vehicle-mounted state. Hereinafter, a torque rod for vibration-proof connection between an automobile engine and a vehicle body will be described.

Figure 2:
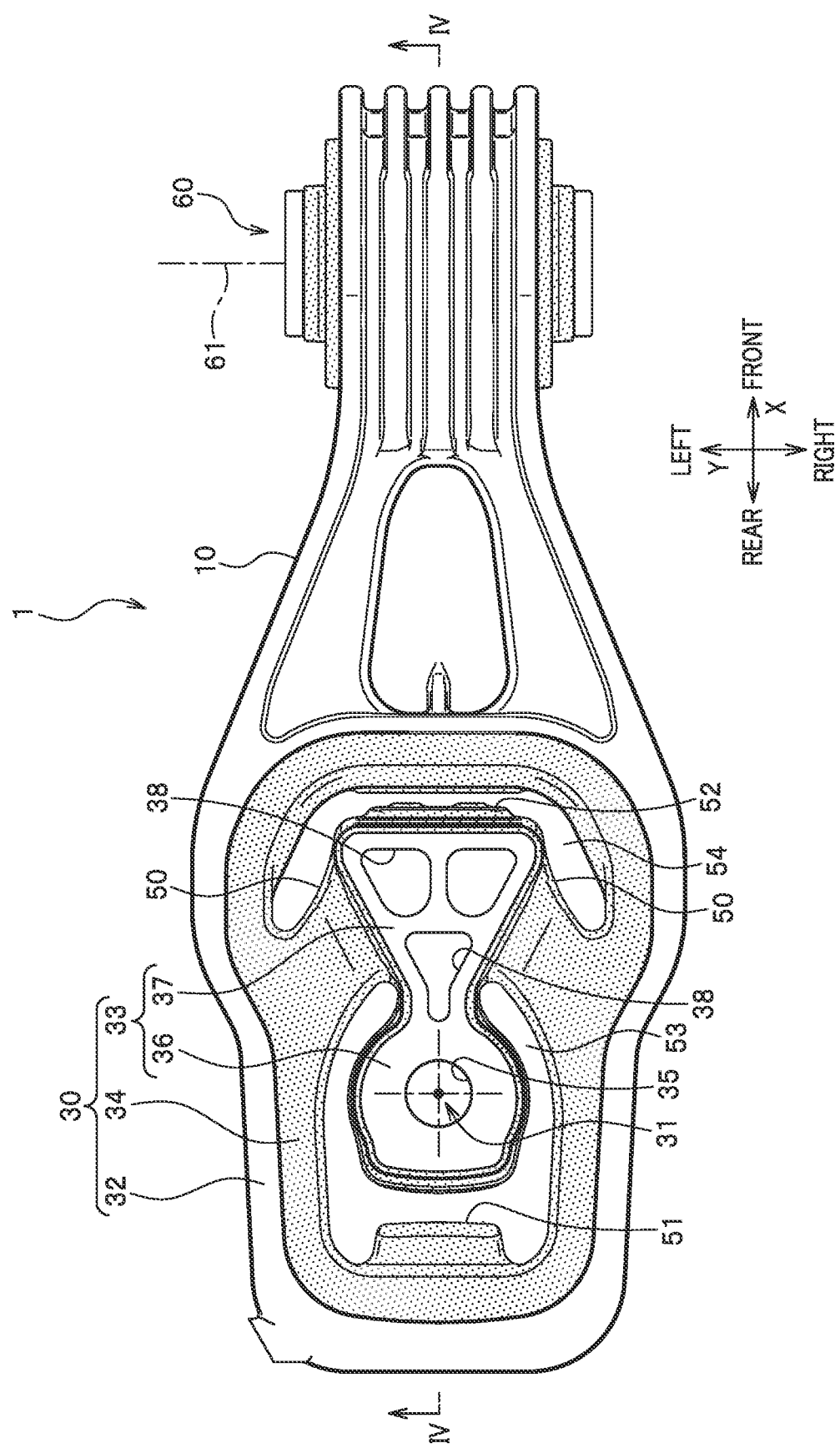
FIG. 2 is a plan view of the torque rod according to the present embodiment.
Figure 3:
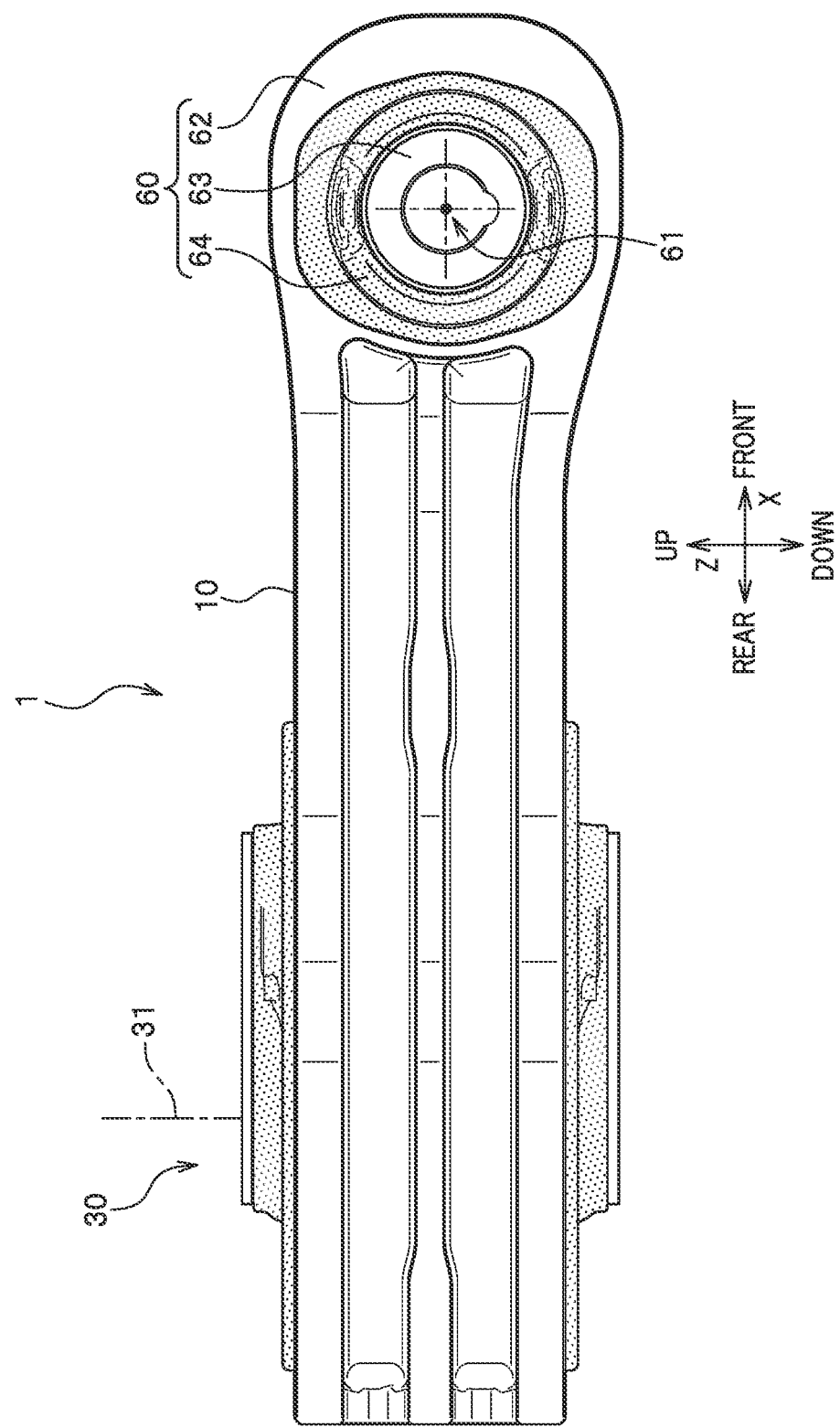
FIG. 3 is a side view of the torque rod according to the present embodiment.
Figure 4:
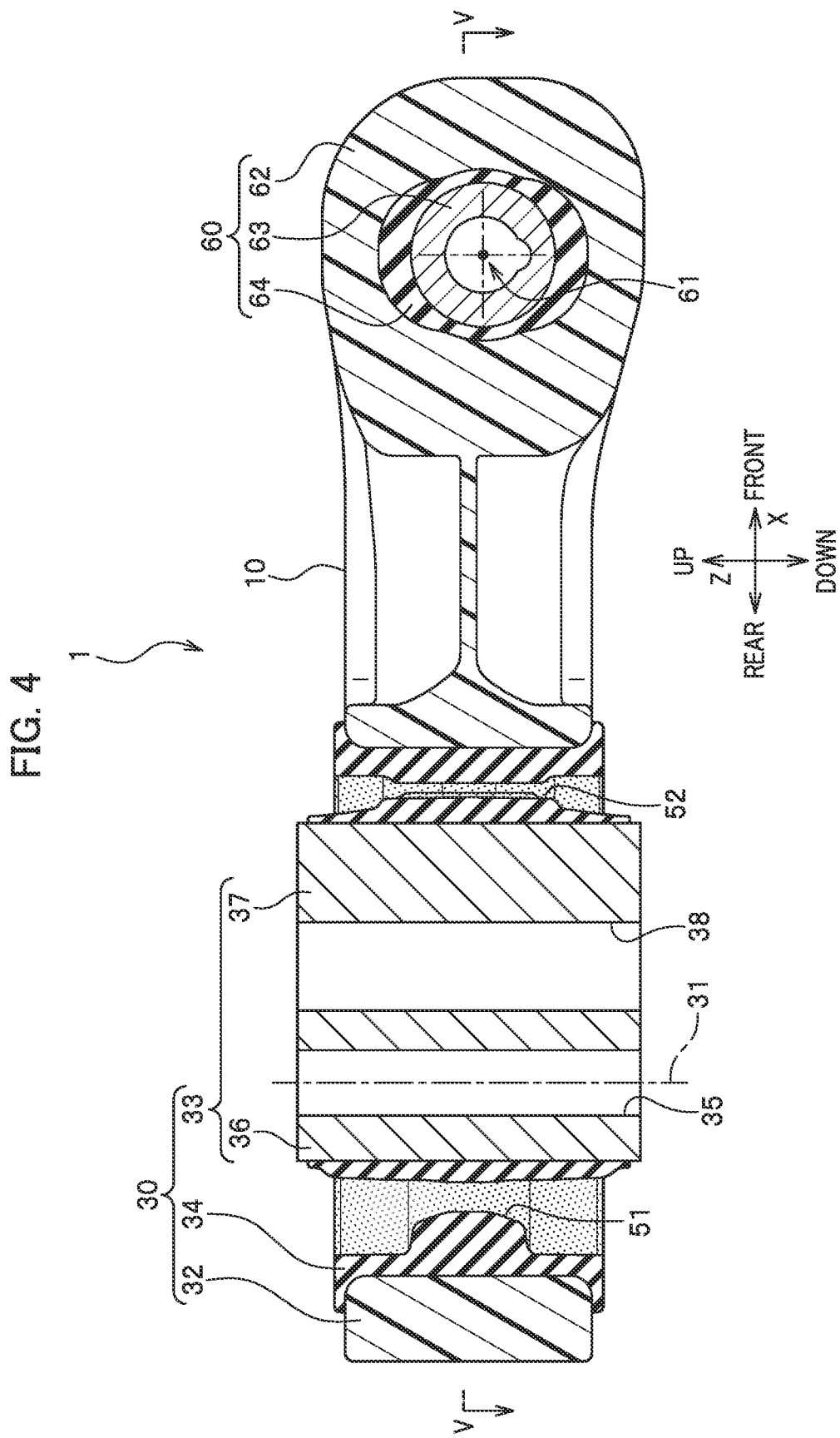
FIG. 4 is a cross-sectional view taken along line IV-IV of FIG. 2.

The torque rod 1 according to an embodiment of the present invention will be described with reference to FIGS. 1 to 8. FIG. 1 is a perspective view of a torque rod 1 according to the present embodiment. FIG. 2 is a plan view of the torque rod 1 according to the present embodiment. FIG. 3 is a side view of the torque rod 1 according to a first embodiment. FIG. 4 is a cross-sectional view taken along line IV-IV of FIG. 2. FIG. 5 is a cross-sectional view taken along line V-V of FIG. 4. FIG. 6 is a cross-sectional view taken along line VI-VI of FIG. 5. FIG. 7 is a cross-sectional view taken along line VII-VII of FIG. 5.

As shown in FIG. 1, the torque rod 1 includes a rod body 10, a large round portion 30 as a first bush, and a small round portion 60 as a second bush.

The rod body 10 is a longitudinal member capable of determining the longitudinal direction. The longitudinal direction of the rod body 10 is set as the X-axis. The X-axis direction corresponds to the front-rear direction.

The large round portion 30 is provided at one end (corresponding to the rear end) in the X-axis direction, which is the longitudinal direction, of the rod body 10. The large round portion 30 includes a first central axis 31 along the Z-axis direction orthogonal to the X-axis direction. The Z-axis direction corresponds to the up-down direction.

The small round portion 60 is provided at the other end (corresponding to the front end) in the X-axis direction of the rod body 10. The small round portion 60 includes a second central axis 61 along the Y-axis direction orthogonal to the X-axis direction. The Y-axis direction corresponds to the right-left direction. The large round portion 30 is larger than the small round portion 60. Specifically, the large round portion 30 viewed in the Z-axis direction (up-down direction) has a larger diameter than the small round portion 60 viewed in the Y-axis direction (right-left direction).

As shown in FIG. 2, the large round portion 30 includes an outer portion 32, an inner portion 33, and an elastic portion 34. The outer portion 32 has a tubular shape and is continuously provided to the rod body 10. The outer portion 32 is a hollow member having a through hole along the direction of the first central axis 31. The inner portion 33 is disposed on the inner side in the radial direction of the tubular outer portion 32. The inner portion 33 includes an annular opening 35 to which an attaching member (not shown) is attached. The opening 35 is formed as a through hole having the first central axis 31 as a center line. The elastic portion 34 is disposed between the outer portion 32 and the inner portion 33.

As shown in FIG. 3, the small round portion 60 includes an outer portion 62, an inner portion 63, and an elastic portion 64. The outer portion 62 has a tubular shape and is continuously provided to the rod body 10. The outer portion 62 is a hollow member having a through hole along the direction of the second central axis 61. The inner portion 63 is disposed on the inner side in the radial direction of the tubular outer portion 62. Here, the inner portion 63 has a cylindrical shape having the second central axis 61 as a center line. The elastic portion 64 is disposed between the outer portion 62 and the inner portion 63. The inner portion 63 of the small round portion 60 is configured to be connected to a not-illustrated engine.

As shown in FIG. 4, the elastic portions 34 and 64 are formed of an elastic material such as rubber. The inner portions 33 and 63 are formed of a metal such as an aluminum alloy. The outer portions 32 and 62 and the rod body 10 are integrally formed of resin here. In this case, for example, the inner portion 33 and the elastic portion 34, and the inner portion 63 and the elastic portion 64 are integrally formed in advance by vulcanization molding or the like. Then, the integrally formed inner portion 33 and elastic portion 34, and the inner portion 63 and elastic portion 64 are disposed in the mold, and resin is injection-molded therearound to integrate the outer portions 32 and 62 and the rod body 10. The outer portions 32 and 62 and the rod body 10 are provided with multiple ribs. As a result, weight reduction is achieved while ensuring the required rigidity.

As shown in FIG. 2, the inner portion 33 of the large round portion 30 includes a base portion 36 having an opening 35 formed therein and an extending portion 37. The base portion 36 has a substantially cylindrical shape when viewed in the Z-axis direction (up-down direction). The extending portion 37 is formed so as to extend from the base portion 36 toward the small round portion 60. The extending portion 37 has a narrow width on the base portion 36 side and gradually increases in width as approaching the small round portion 60. The extending portion 37 has a substantially isosceles triangle shape or isosceles trapezoid shape when viewed in the Z-axis direction (up-down direction). The inner portion 33 includes multiple cutout portions 38 in addition to the opening 35. The cutout portions 38 are each formed as a through hole here, but may be a bottomed hole.

As shown in FIG. 5, the outer portion 32 of the large round portion 30 includes a first opening portion 41 and a second opening portion 42. The first opening portion 41 accommodates the base portion 36 of the inner portion 33. The second opening portion 42 accommodates the extending portion 37 of the inner portion 33. The width of the first opening portion 41, that is, the distance between the inner surfaces in the right-left direction of the first opening portion 41 is smaller than the width of the second opening portion 42, that is, the distance between the inner surfaces in the right-left direction of the second opening portion 42.

The elastic portion 34 of the large round portion 30 includes joint portions 50 and stoppers 51 and 52. A pair of joint portions 50 are provided on the right and left of the extending portion 37 of the inner portion 33. The outer surface of the extending portion 37 includes a first extending portion side surface 43 and a second extending portion side surface 44, to which the inner ends of the joint portions 50 are joined. Further, the inner surface of the outer portion 32 of the large round portion 30 includes a first outer portion side surface 45 and a second outer portion side surface 46, to which the outer ends of the joint portions 50 are joined. The first extending portion side surface 43 and the first outer portion side surface 45, and the second extending portion side surface 44 and the second outer portion side surface 46 are formed so as to be parallel to each other. Here, parallel is a concept that includes not only strict parallelism but also substantially parallelism that is seen parallel in terms of common general technical knowledge.

A hollow portion 53 penetrating in the Z-axis direction (up-down direction) is formed on the rear side of the joint portion 50, and a hollow portion 54 penetrating in the Z-axis direction (up-down direction) is formed on the front side of the joint portion 50. The hollow portions 53 and 54 mean a penetrating space here. The pair of joint portions 50, 50 have a V-shape that opens rearward with the extending portion 37 in between. The joint portions 50 absorb the vibration in the X-axis direction (front-rear direction) of the large round portion 30. The deformation in this case includes a stage in a soft spring state in which the hollow portions 53 and 54 are first crushed and deformed, and a stage in a hard spring state in which the stoppers 51 and 52 are subsequently in contact with the respective facing surfaces and deformed. Further, the joint portions 50 absorb the vibration in the Z-axis direction (up-down direction) of the large round portion 30.

As shown in FIGS. 5 and 6, the inner portion 33 of the large round portion 30 is configured to be connected to a not-illustrated vehicle body via an attaching member attached to the opening 35 of the base portion 36.

As shown in FIGS. 5 and 7, the joint portions 50 of the elastic portion 34 of the large round portion 30 are provided between the extending portion 37 of the inner portion 33 and the outer portion 32. The joint portions 50 are not provided between the base portion 36 of the inner portion 33 and the outer portion 32.

Next, the operations of the torque rod 1 configured in this way will be described. As shown in FIG. 1, the torque rod 1 according to the present embodiment is installed so that the direction of the first central axis 31 of the opening 35 of the large round portion 30 is in the up-down direction when mounted on a vehicle. When the engine is supported by the vehicle body via the torque rod 1, vibration from the engine is inputted from the inner portion 63 of the small round portion 60 to the outer portion 62 via the elastic portion 64. The vibration inputted to the outer portion 62 of the small round portion 60 is inputted to the outer portion 32 of the large round portion 30 via the rod body 10, and is further transmitted from the inner portion 33 to the vehicle body via the elastic portion 34.

As shown in FIG. 5, when vibration in the up-down direction is inputted to the small round portion 60, the large round portion 30 vibrates vertically so as to rotate around the axis A. Note that the axis A is an axis that passes through the center of gravity G of the torque rod 1 and is parallel to the Y-axis direction (right-left direction). The rotational rigidity S in this case is proportional to $(K \times L^2)$. Here, K is the spring constant of the joint portions 50 in the direction of the first central axis 31 of the opening 35 of the large round portion 30. L is the distance (span) between the elastic deformation center C of the joint portions 50 of the large round portion 30 and the center of gravity G of the torque rod in the longitudinal direction of the rod body 10.

In the large round portion 30 according to the present embodiment, joint portions 50 are provided between the extending portion 37 and the outer portion 32. Therefore, conventionally, the elastic deformation center C of the joint portions 50 of the large round portion 30 is located on the rear side of the opening 35 (the side opposite to the center of gravity G of the torque rod 1), but in the present embodiment, it is moved to the front side (the center of gravity G side of the torque rod 1) from the opening 35. Therefore, the distance L becomes smaller and the rotational rigidity S decreases. As a result, the peak value of the vibration transmission characteristic is reduced. Further, since the rigid body resonance frequency shifts to the lower side, the vibration transmission characteristic in the frequency range with high sensitivity on the vehicle body side is lowered.

Figure 8:
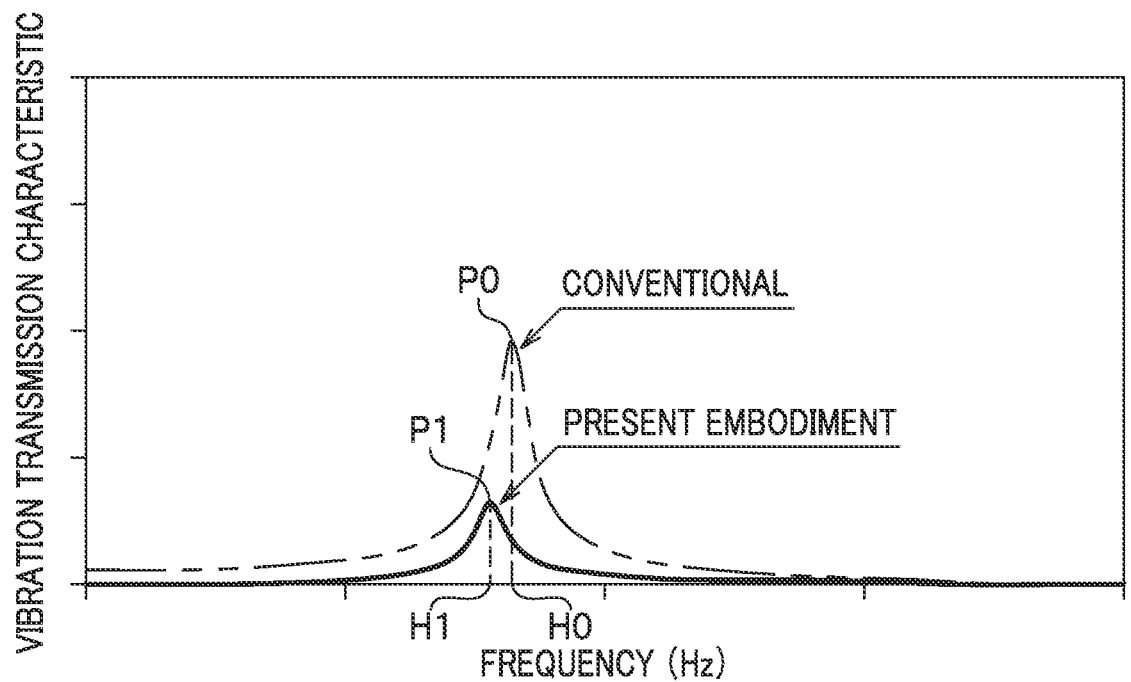
FIG. 8 is a graph showing the vibration transmission characteristic curve of the torque rod according to the present embodiment together with the vibration transmission characteristic curve of the conventional torque rod.

FIG. 8 is a graph showing the vibration transmission characteristic curve of the torque rod 1 according to the present embodiment together with the vibration transmission characteristic curve of the conventional torque rod. Note that the conventional torque rod is different from the torque rod 1 according to the present embodiment in that the inner portion of the large round portion has a cylindrical shape, and a joint portion is provided between the cylindrical inner portion and the outer portion.

As shown in FIG. 8, it can be seen that the peak value (maximum value) P1 of the vibration transmission characteristic of the torque rod 1 according to the present embodiment is sufficiently reduced as compared with the peak value P0 of the vibration transmission characteristic of the conventional torque rod. Further, it can be seen that the rigid body resonance frequency H1 of the torque rod 1 according to the present embodiment is shifted to the lower side than the rigid body resonance frequency H0 of the conventional torque rod.

As described above, the torque rod 1 according to the present embodiment includes a rod body 10, a large round portion 30, and a small round portion 60. The large round portion 30 is provided at one end of the rod body 10. The small round portion 60 is provided at the other end of the rod body 10. The large round portion 30 includes an outer portion 32, an inner portion 33, and a joint portion 50. The outer portion 32 has a tubular shape. The inner portion 33 is provided on the inner side of the outer portion 32 and has an annular opening 35 to which an attaching member is attached. The joint portion 50 elastically joins the outer portion 32 and the inner portion 33. The inner portion 33 includes a base portion 36 and an extending portion 37. The base portion 36 has an opening 35 formed therein. The extending portion 37 extends from the base portion 36 toward the small round portion 60. The joint portion 50 is provided between the extending portion 37 and the outer portion 32.

In such present embodiment, the peak value of the vibration transmission characteristic is reduced (see FIG. 8). Further, since the rigid body resonance frequency shifts to the lower side, the vibration transmission characteristic in the frequency range with high sensitivity on the vehicle body side is lowered (see FIG. 8). As a result, the room sound level is reduced and the riding comfort is improved.

That is, according to the present embodiment, it is possible to provide a torque rod 1 capable of lowering a vibration transmission characteristic from a viewpoint different from the conventional one without increasing the weight.

In addition, in the present embodiment, the extending portion 37 has a narrow width on the base portion 36 side and gradually increases in width as approaching the small round portion 60.

In this configuration, the surface of the extending portion 37 (the first extending portion side surface 43 and the second extending portion side surface 44) provided with the joint portion 50 is a surface inclined in the direction toward the base portion 36 side. That is, the normals to the right and left surfaces of the extending portion 37 extend diagonally rearward in the present embodiment. Therefore, the joint portion 50 can receive a compressive load acting in the longitudinal direction of the rod body 10. Therefore, the spring constant of the large round portion 30 in the longitudinal direction of the rod body 10 becomes high. Further, since the deformation of the joint portion 50 in the direction of the first central axis 31 of the opening 35 of the large round portion 30 is a shear deformation, it is more easily deformed than the compression deformation of the joint portion 50 in the longitudinal direction of the rod body 10. Therefore, the spring constant of the joint portion 50 in the direction of the first central axis 31 of the opening 35 of the large round portion 30 becomes relatively small, and the vibration transmission characteristic is lowered. As a result, the spring constant of the large round portion 30 in the longitudinal direction of the rod body 10 can be increased while reducing the vibration transmission characteristic.

Further, in the present embodiment, the outer surface of the extending portion 37 includes a first extending portion side surface 43 and a second extending portion side surface 44, to which the inner end of the joint portion 50 is joined. Further, the inner surface of the outer portion 32 of the large round portion 30 includes a first outer portion side surface 45 and a second outer portion side surface 46, to which the outer end of the joint portion 50 is joined. Then, the first extending portion side surface 43 and the first outer portion side surface 45, and the second extending portion side surface 44 and the second outer portion side surface 46 are formed so as to be parallel to each other.

In this configuration, the joint portion 50 can more reliably receive the compressive load acting in the longitudinal direction of the rod body 10.

Further, in the present embodiment, the outer portion 32 includes a first opening portion 41 that accommodates the base portion 36 of the inner portion 33 and a second opening portion 42 that accommodates the extending portion 37 of the inner portion 33, and the width of the first opening portion 41 is smaller than the width of the second opening portion 42.

In this configuration, the outer portion 32 of the large round portion 30 can be made smaller, so that the weight reduction and cost reduction of the torque rod 1 are possible.

Further, in the present embodiment, the inner portion 33 includes a cutout portion 38 in addition to the opening 35.

In this configuration, by forming a cutout portion 38 in the inner portion 33 for weight reduction, it is possible to suppress an increase in the weight of the torque rod 1 even if the extending portion 37 of the inner portion 33 is lengthened, which improves the degree of freedom in designing the length of the extending portion 37. Therefore, the torque rod 1 can be used in a wide range of vehicle types.

Although the embodiments of the present invention have been described above, the present invention is not limited to the above-described embodiments and can be appropriately modified without departing from the spirit of the present invention. In addition, a part of the configuration of each of the above-described embodiments can be added, deleted, or replaced.

For example, the outer portions 32 and 62 and the rod body 10 are formed of resin in the above embodiment, but are not limited thereto, and may be formed of a light metal material such as an aluminum alloy.

Further, the inner portion 63 has a cylindrical shape in the above embodiment, but is not limited thereto. The inner portion 63 may have a structure that can be connected to a prime mover such as a not-illustrated engine, and may have a deformed tubular shape such as an elliptical cylinder or a square cylinder, or may have a solid rod shape.

Further, the above embodiment is such that the first central axis 31 of the large round portion 30 and the second central axis 61 of the small round portion 60 are set vertically when viewed in the longitudinal direction of the rod body 10, but is not limited thereto. The first central axis 31 of the large round portion 30 and the second central axis 61 of the small round portion 60 may be set in the same direction.

What is claimed is:

1. A torque rod comprising:
   a rod body;
   a first bush that is provided at one end of the rod body; and
   a second bush that is provided at the other end of the rod body, wherein
   the first bush includes
      a tubular outer portion,
      an inner portion that is provided on an inner side of the outer portion and has an annular opening to which an attaching member is attached, and
      a joint portion that elastically joins the outer portion and the inner portion,
   the inner portion includes
      a base portion that has the opening formed therein and
      an extending portion that extends from the base portion toward the second bush, wherein the extending portion is formed in a substantially triangular shape when seen in an axial direction of the first bush, a vertex of the triangular shape is positioned at the base portion and a side of the triangular shape extends from the vertex to another vertex of the triangular shape while being continuously inclined at a predetermined angle with respect to a longitudinal direction of the torque rod when seen in the axial direction of the first bush, and
   the joint portion is provided between the extending portion and the outer portion.

2. The torque rod according to claim 1, wherein the extending portion has a narrow width on a base portion side and gradually increases in width as the extending portion approaches the second bush.

3. The torque rod according to claim 2, wherein
   an outer surface of the extending portion includes a first extending portion side surface and a second extending portion side surface, to which the joint portion is joined,
   an inner surface of the outer portion includes a first outer portion side surface and a second outer portion side surface, to which the joint portion is joined, and
   the first extending portion side surface and the first outer portion side surface, and the second extending portion side surface and the second outer portion side surface are formed so as to be parallel to each other.

4. The torque rod according to claim 1, wherein
   the outer portion includes
      a first opening portion that accommodates the base portion of the inner portion and
      a second opening portion that accommodates the extending portion of the inner portion, and
   a width of the first opening portion is smaller than a width of the second opening portion.

5. The torque rod according to claim 1, wherein the inner portion includes a cutout portion in addition to the opening.

* * * * *